(12) United States Patent
Royt

(10) Patent No.: US 10,384,592 B1
(45) Date of Patent: Aug. 20, 2019

(54) AUTOMATIC LOCK FOR CARGO CONTAINER

(71) Applicant: Peck & Hale, L.L.C., West Sayville, NY (US)

(72) Inventor: Joseph Royt, Fresh Meadows, NY (US)

(73) Assignee: Peck & Hale, L.L.C., West Sayville, NY (US)

( * ) Notice: Subject to any disclaimer, the term of this patent is extended or adjusted under 35 U.S.C. 154(b) by 45 days.

(21) Appl. No.: 15/668,859

(22) Filed: Aug. 4, 2017

Related U.S. Application Data

(60) Provisional application No. 62/370,980, filed on Aug. 4, 2016.

(51) Int. Cl.
*B60P 7/13* (2006.01)
*B65D 90/00* (2006.01)

(52) U.S. Cl.
CPC .......... *B60P 7/132* (2013.01); *B65D 90/0013* (2013.01); *B65D 90/0026* (2013.01)

(58) Field of Classification Search
CPC ............ B65D 90/0013; B65D 90/0026; B65D 90/0006; B65D 88/022; B65D 2590/0033; B65D 2211/00; B65D 2590/0016; B60P 7/13; B60P 7/132; B60P 1/6481
USPC ........ 410/70, 84, 69, 77, 76, 82, 73, 80, 91, 410/32; 292/198, 204, 209, 219, 341.17, 292/63, 104, 109
See application file for complete search history.

(56) References Cited

U.S. PATENT DOCUMENTS

| | | | | |
|---|---|---|---|---|
| 4,776,736 | A * | 10/1988 | Tatina | B60P 7/13 410/69 |
| 5,020,947 | A | 6/1991 | Marcelius | |
| 5,454,673 | A * | 10/1995 | DiMartino | B65D 90/0006 24/287 |
| 5,570,981 | A | 11/1996 | Brewster | |
| 5,613,814 | A | 3/1997 | Jackson | |
| 5,782,511 | A | 7/1998 | Schwarz | |
| 5,931,617 | A * | 8/1999 | Kroll | B60P 7/132 410/72 |
| 6,546,878 | B1 * | 4/2003 | Smith | B61D 3/187 105/3 |
| 6,974,164 | B2 | 12/2005 | Brewster | |
| 7,014,234 | B2 | 3/2006 | Walker | |
| 7,056,081 | B2 | 6/2006 | Kelly | |
| 7,114,898 | B2 | 10/2006 | Brewster | |
| 7,637,704 | B2 | 12/2009 | Morin | |
| 7,883,305 | B2 | 2/2011 | Watson | |
| 8,007,214 | B2 | 8/2011 | Brewster | |
| 8,177,463 | B2 | 5/2012 | Walker | |
| 8,342,786 | B2 | 1/2013 | Kelly | |
| 8,458,861 | B2 | 6/2013 | Ostberg | |
| 8,523,501 | B2 | 9/2013 | Kelly | |

(Continued)

FOREIGN PATENT DOCUMENTS

| | | |
|---|---|---|
| EP | 507010 | 10/1992 |
| EP | 2143665 | 1/2010 |
| GB | 1260364 | 1/1972 |

*Primary Examiner* — D Glenn Dayoan
*Assistant Examiner* — Sunsurraye Westbrook
(74) *Attorney, Agent, or Firm* — Schroeder Law PC

(57) ABSTRACT

An automatic lock for installation in a bottom corner fitting of a cargo container to secure stacked containers to one another. The automatic lock may be installed in the bottom corner fitting at the time of manufacture of the container or may be retrofit into existing containers.

20 Claims, 18 Drawing Sheets

(56) References Cited

U.S. PATENT DOCUMENTS

| | | |
|---|---|---|
| 8,684,644 B2 | 4/2014 | Metternich |
| 8,827,612 B2 * | 9/2014 | Kelly ..................... B60P 7/13 |
| | | 410/84 |
| 9,011,055 B1 | 4/2015 | Royt |
| 9,359,129 B1 | 6/2016 | Royt |
| 9,505,336 B2 * | 11/2016 | Royt ................. B65D 90/0006 |
| 2010/0290855 A1 | 11/2010 | Strien |
| 2010/0303573 A1 | 12/2010 | Brewster |

* cited by examiner

Domestic Container on ISO Container
1st Tier and 2nd Tier Interface

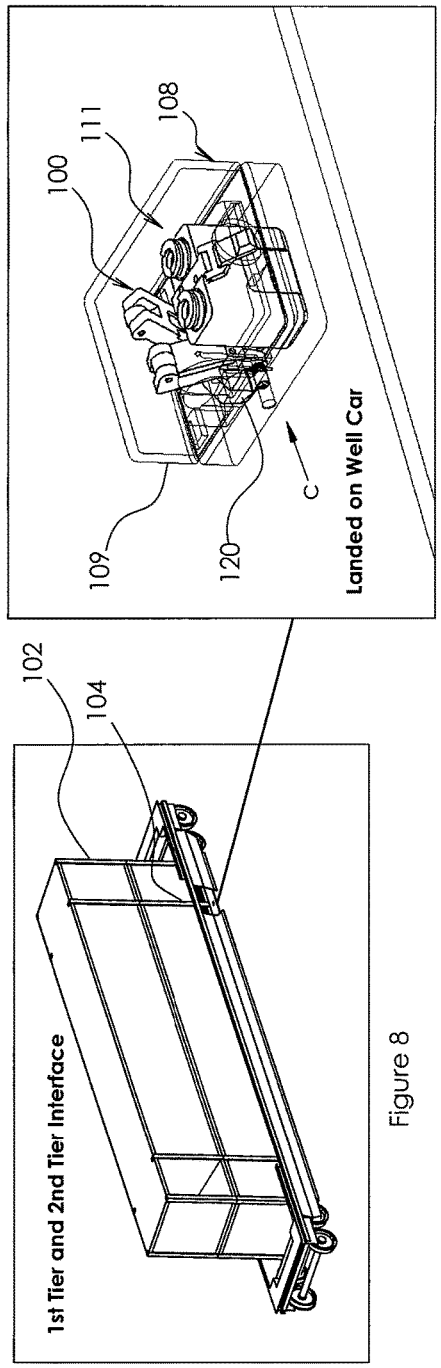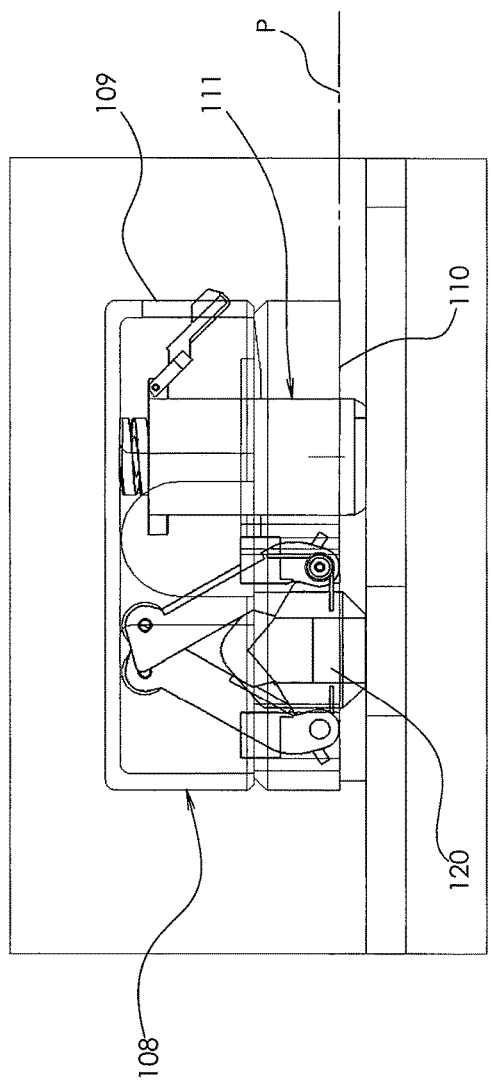

DETAIL A

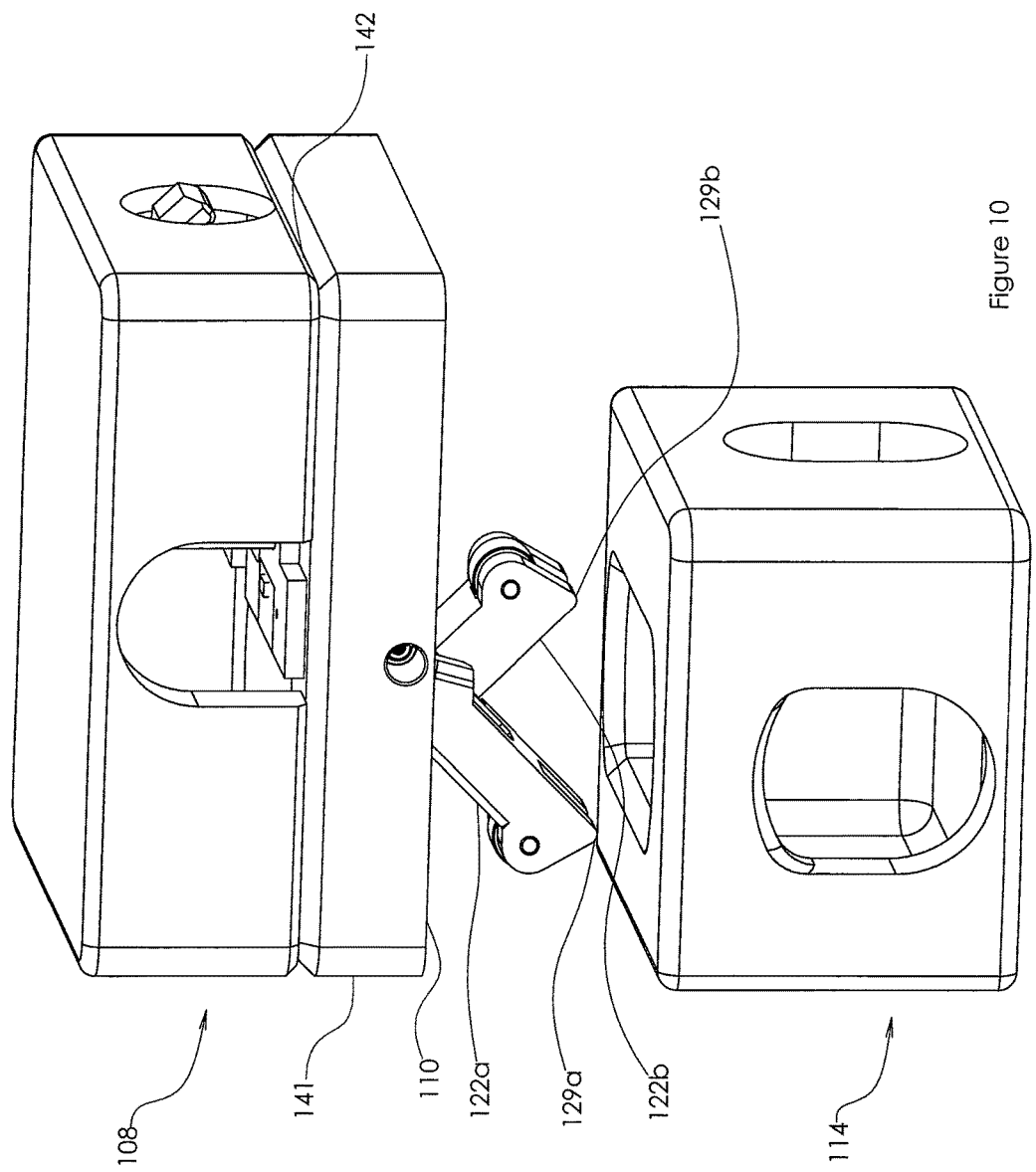

VIEW D

VIEW E

AUTOMATIC LOCK FOR CARGO CONTAINER

This application claims the benefit of U.S. Provisional Application Ser. No. 62/370,980, filed Aug. 4, 2016.

BACKGROUND OF THE INVENTION

The present invention relates to the interlocking of stacked cargo containers and, more particularly, to automatic locks which are secured to and travel with the container.

The prior art includes various devices for interconnecting stacked cargo containers. These devices include manual locks, semi-automatic locks, and automatic locks. As will be recognized to those skilled in the art, manual locking devices must be manually installed within the corner fitting, are manually locked, are manually unlocked, and are then manually removed from the corner fitting. Semi-automatic devices must be manually installed in the corner fitting, provide automatic locking but must be manually unlocked, and are then manually removed from the corner fitting. Finally, automatic devices must be manually installed in the corner fitting, provide automatically locking and unlocking, and are then manually removed from the corner fitting.

Although the art has advanced from manual locks to semi-automatic locks to automatic locks, and although each new design has provided certain additional benefits, today's fully automatic locks still have the drawback of requiring an operator to manually install and remove the device from the corner fitting of the container, resulting in additional time and cost during loading/unloading.

There is therefore a need in the art for an automatic lock which is capable of interconnecting two stacked containers, and which is preferably affixed to the container, thereby eliminating the need to install and remove such device during loading/unloading of the container.

SUMMARY OF THE INVENTION

The present invention, which addresses the needs of the prior art, provides a lock assembly for retrofitting a bottom corner fitting of a cargo container. The lock assembly includes a) a body portion, the body portion defining a substantially rectangular upper engagement edge sized for mating with and securement to the bottom corner fitting, the body portion further defining a substantially rectangular lower mating edge, the lower mating edge defining a plane P, the body portion defining a first opening extending from the upper engagement edge to the lower mating edge, the first opening defining opposing first and second sidewalls; and b) an automatic locking mechanism positioned within the first opening of the body portion, the automatic locking mechanism including: i) first and second locking arms having first and second ends respectively, the first end of the first locking arm being pivotally attached to the first sidewall of the first opening and the first end of the second locking arm being pivotally attached to the second sidewall of the first opening; ii) first and second rollers, the first roller being positioned at the second end of the first locking arm and the second roller being positioned at the second end of the second locking arm; iii) first and second operating springs, the first operating spring cooperating with the first end of the first locking arm to resist counterclockwise rotation of the first locking arm about the first end thereof, the second operating spring cooperating with the first end of the second locking arm to resist clockwise rotation of the second locking arm about the first end thereof; and iv) first and second locating springs, the first locating spring cooperating with the first end of the first locking arm to bias the first locking arm to a first at-rest orientation, the second locating spring cooperating with the first end of the second locking arm to bias the second locking arm to a second at-rest orientation. Finally, the locking arms extend downward from the body portion and through the plane P in an X-shaped pattern when the first and second locking arms are located in the at-rest orientations such that the second ends of the locking arms are located to engage an adjacent corner fitting.

The present invention also provides a cargo container including an automatic locking mechanism in a bottom corner fitting. The cargo container includes a closable vessel for stowing cargo during transportation, a plurality of upper corner fittings secured to an upper surface of the vessel for allowing stacking of a second cargo container thereon, and a plurality of bottom corner fittings secured to a lower surface of the vessel. Each of the bottom corner fittings includes: a) a substantially rectangular body defining a lower mating edge, the lower mating edge defining a plane P, the body defining a first opening extending through the lower mating edge, the first opening defining opposing first and second sidewalls; and b) an automatic locking mechanism positioned within said first opening of said body. The automatic locking mechanism includes: i) first and second locking arms having first and second ends respectively, the first end of the first locking arm being pivotally attached to the first sidewall of the first opening and the first end of the second locking arm being pivotally attached to the second sidewall of the first opening; ii) first and second rollers, the first roller being positioned at the second end of the first locking arm and the second roller being positioned at the second end of the second locking arm; iii) first and second operating springs, the first operating spring cooperating with the first end of the first locking arm to resist counterclockwise rotation of the first locking arm about the first end thereof, the second operating spring cooperating with the first end of the second locking arm to resist clockwise rotation of the second locking arm about the first end thereof; and iv) first and second locating springs, the first locating spring cooperating with the first end of the first locking arm to bias the first locking arm to a first at-rest orientation, the second locating spring cooperating with the first end of the second locking arm to bias the second locking arm to a second at-rest orientation. Finally, the locking arms extend downward from the body portion and through the plane P in an X-shaped pattern when the first and second locking arms are located in the at-rest orientations such that the second ends of the locking arms are located to engage an adjacent corner fitting.

As a result, the present invention an automatic lock which is capable of interconnecting two stacked containers, and which is preferably affixed to the container, thereby eliminating the need to install and remove such device during loading/unloading of the container.

BRIEF DESCRIPTION OF THE DRAWINGS

FIG. 6b is a view taken along Arrow A of FIG. 6a;

FIG. 7b is a view taken along Arrow B of FIG. 7a;

FIG. 8 is a perspective view of a typical well-car having two 53' domestic cargo containers stacked thereon, the domestic containers incorporating the secondary locking mechanisms of the present invention;

FIG. 8a is an enlarged detail taken from FIG. 8;

FIG. 8b is a view taken along Arrow C of FIG. 8a;

FIG. 9b is an enlarged detail taken from FIG. 9a;

FIG. 10 is a detail similar to FIG. 9 showing the secondary locking mechanism prior to engagement with the underlying corner fitting;

DETAILED DESCRIPTION OF THE INVENTION

Figure 1:
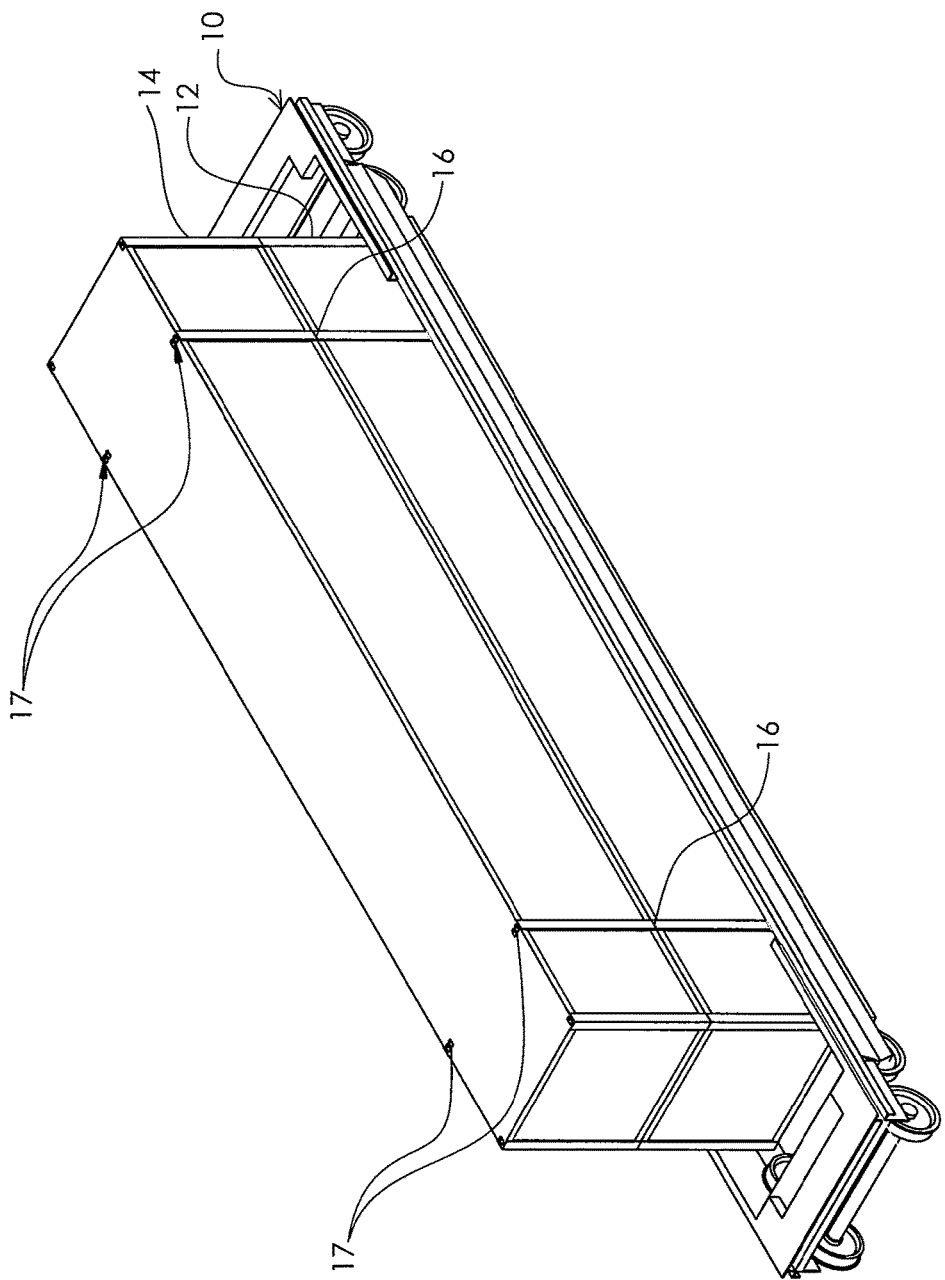
FIG. 1 is a perspective view of a typical well-car having two 53' domestic cargo containers stacked thereon.

It is commonplace in the rail industry to use what are commonly referred to as well-cars (also known as double-stack cars) to transport cargo containers. A typical well-car 10 is shown in FIG. 1. A lower container 12 sits within the well of the car, while an upper container 14 rests upon lower container 12. Those skilled in the art will recognize containers 12, 14 to be 53' U.S. Domestic Containers, which is a common container used in the rail industry. These 53' containers are all made with a standard size and configuration, including the location of four bottom dual corner fittings 16 located on the lower surface and four top single corner fittings 17 located on the upper surface.

Figure 2:
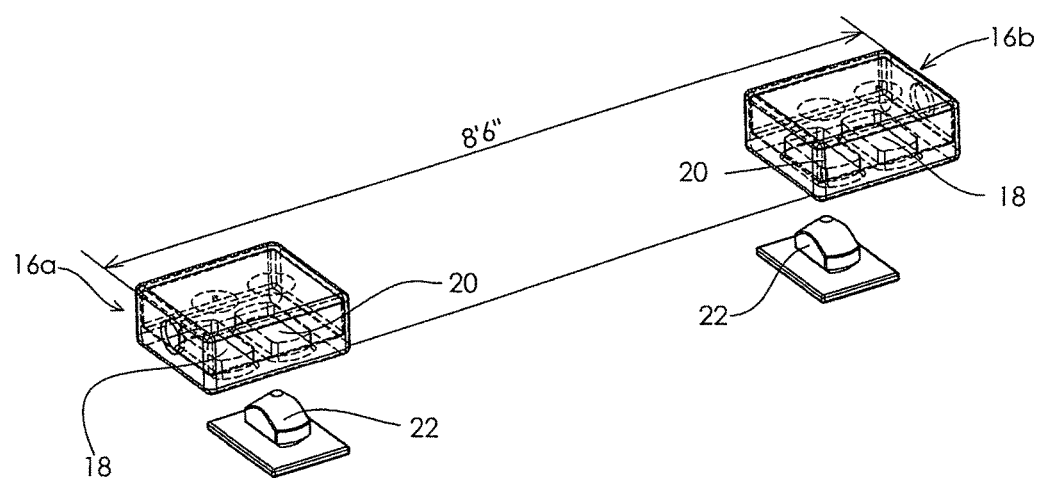
FIG. 2 is a schematical representation of the corner fittings of a domestic cargo container interacting with the retainers located on the floor of a well-car.

Referring now to FIG. 2, each of containers 12, 14 is formed with a standard width of 8'-6". As best seen in FIG. 1, the corner fittings are located at the outer edges of the container, such that the distance from the outer edge of corner fitting 16a to the outer edge of corner fitting 16b is also 8'-6". Each of corner fittings 16 located on the lower surface of the domestic cargo container is formed with both an outboard opening 18 and an inboard opening 20. Located at the bottom of each well-car are four retainers 22, which are sized and located to engage and penetrate the inboard openings of the four corner fittings located on the bottom surface of container 12 when container 12 is lowered into the well of car 10. The combination of retainers 22 and the walls of the well-car ensure that container 12 is secure for transport. When a second container, e.g., container 14, is to be stacked upon container 12, it is industry practice today to use a plurality of twistlocks to interconnect and lock container 14 to container 12.

Figure 3:
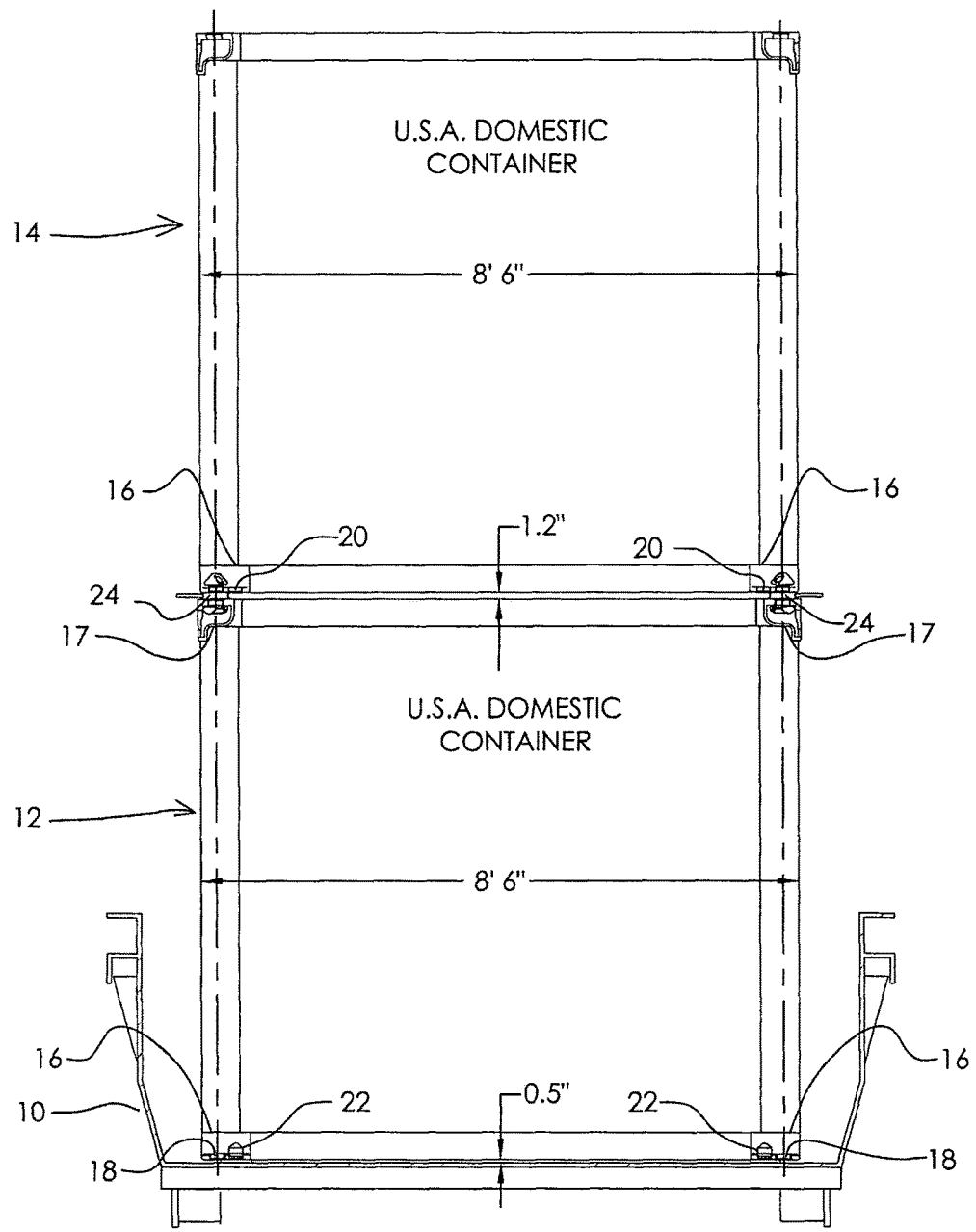
FIG. 3 is a schematical end view of a well-car showing two stacked domestic cargo containers.

The stacking of two 53' domestic containers is best illustrated with reference to FIG. 3. As shown, retainers 22 affixed to the bottom of well car 10 penetrate inboard openings 20 in each of the four corner fittings 16 located on the bottom surface of container 12. The outboard openings 18 located in these same corner fittings are not used in this application. Four twistlocks 24 are then used to interconnect and lock container 14 to container 12.

Figure 4:
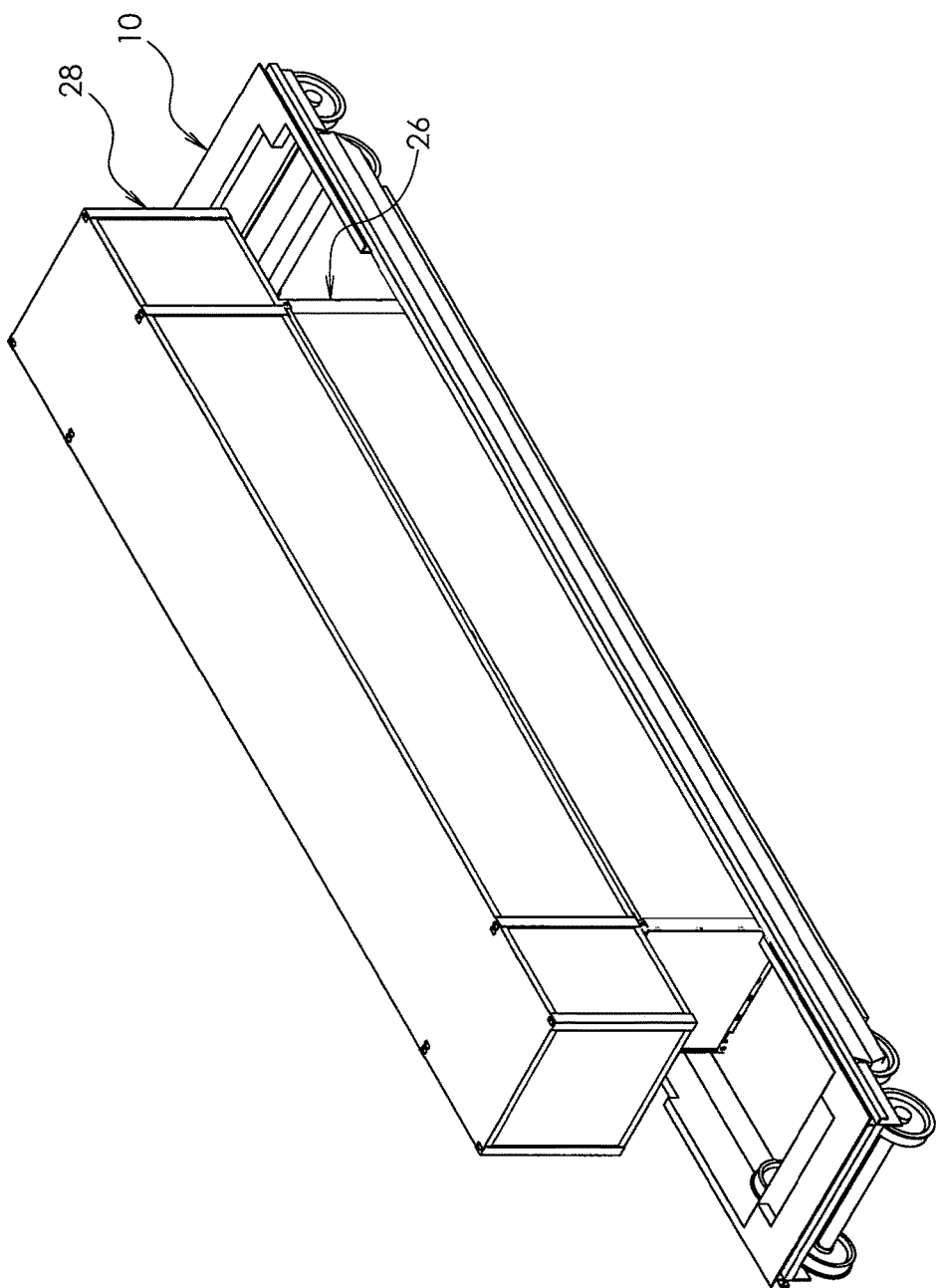
FIG. 4 is a perspective view of a typical well-car having a 53' domestic cargo container stacked upon a 40' ISO cargo container.
Figure 5:
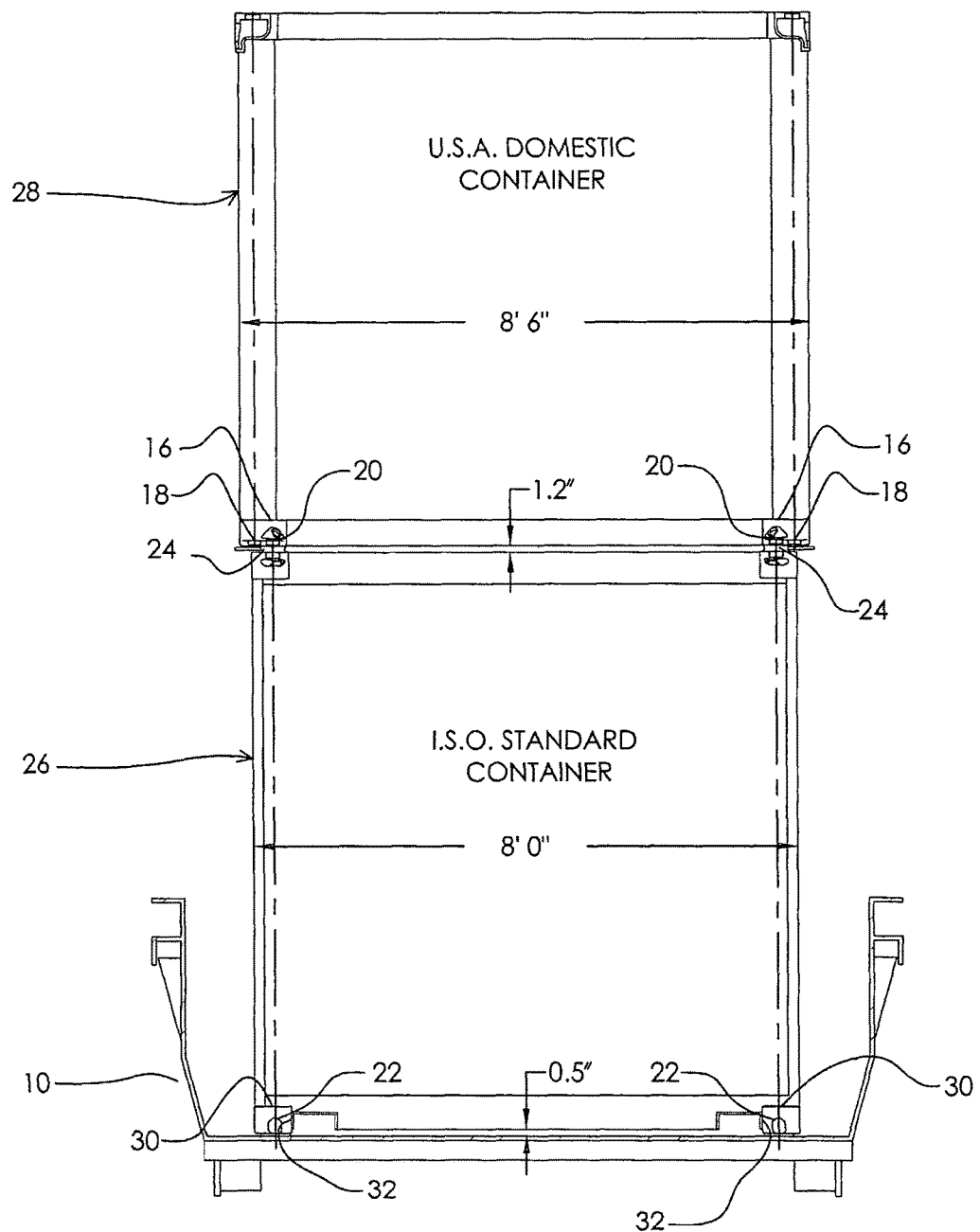
FIG. 5 is a schematical end view of a well-car showing a domestic cargo container stacked upon an ISO cargo container.

The rail industry also uses 8' wide containers referred to as ISO standard containers. These ISO standard containers can be formed with nominal lengths of 10', 20', 30' and 40'. A 40' ISO container 26 is shown in FIG. 4. As shown, container 26 is positioned within the well of car 10. A 53' domestic container 28 is stacked thereon. This stacked relationship is best illustrated with reference to FIG. 5. As illustrated in FIG. 5, container 26 includes a plurality of corner fittings 30, all of which are formed with a single opening 32. Openings 32 are located to engage retainers 22 in the same manner that openings 20 of corner fittings 16 engaged retainers 22. A plurality of twistlocks 24 are used to interconnect and lock container 28 to container 26. Inasmuch as container 26 is narrower in profile, inboard openings 20 of corner fittings 16 of container 28 receive one of the locking cones of the twistlocks. In this application, outboard openings 18 of corner fittings 16 of container 28 are not used.

As described in U.S. Pat. No. 9,359,129, the dual opening configuration of the corner fittings on the lower surface of domestic containers can be utilized in the design of an automatic lock for such containers. More particularly, the described locking system cooperates with the outboard opening of each bottom dual corner fitting, and with the single opening of each top corner fitting. Such an arrangement still allows the domestic container to be used in the applications described above. More particularly, the described arrangement will not interfere with retainers 22 of well-car 10 engaging inboard openings 20 of corner fittings 16 when the domestic container is placed within the well of car 10. In such a scenario, the described locking system will simply remain unused. In the arrangement shown in FIG. 5, the described locking system will also remain in an unused condition without interfering with the usage of four twistlocks to interconnect and lock container 28 to container 26. However, in the common application shown in FIG. 3 (wherein a domestic container is stacked upon another domestic container), the described automatic locking system will eliminate the need for twistlocks 24, thus saving time and money during loading and unloading of the containers.

It has been discovered herein that a secondary automatic locking mechanism can be installed within the inboard openings 20 of corner fittings 16. This secondary automatic locking mechanism allows for automatic coupling of domestic container 28 to ISO container 26 in the stacking configuration shown in FIG. 5. As a result, the need to utilize twistlocks in the stacking configuration shown in FIG. 5 is eliminated. Of course, the secondary automatic locking mechanism must be designed and configured in such a manner as to not interfere with the landing of a first domestic container on a second domestic container—or with the loading of a domestic container onto the floor of a well-car. More particularly, the secondary automatic locking mechanism cannot interfere with the engagement of retainers 22 located on the floor of the well-car with the inboard opening of the bottom corner fittings.

Figure 6:
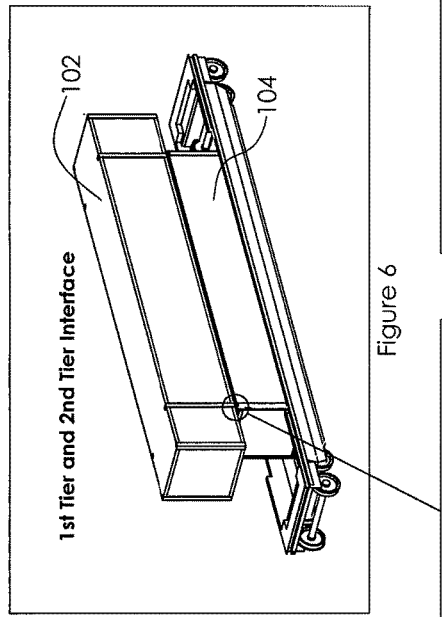
FIG. 6 is perspective view of a typical well-car having a 53' domestic cargo container stacked upon a 40' ISO cargo container, the domestic container incorporating the secondary locking mechanisms of the present invention.
Figure 6B:
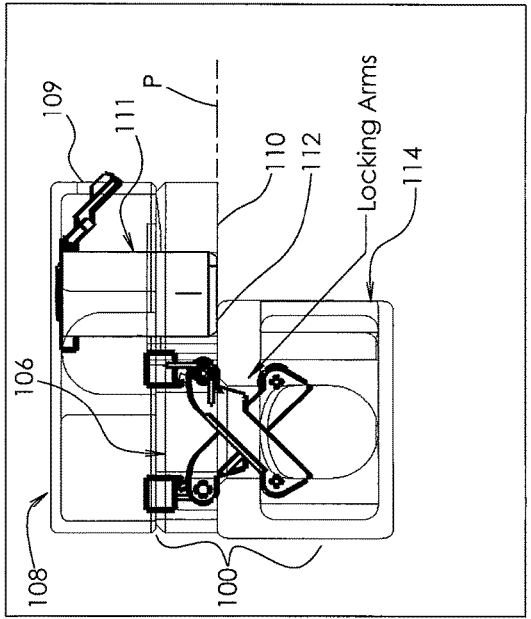
Figure 6A:
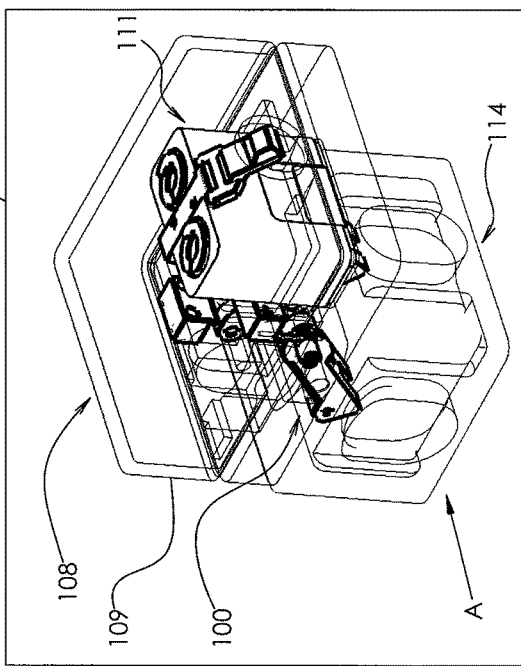
FIG. 6a is an enlarged detail taken from FIG. 6.
Figure 7A:
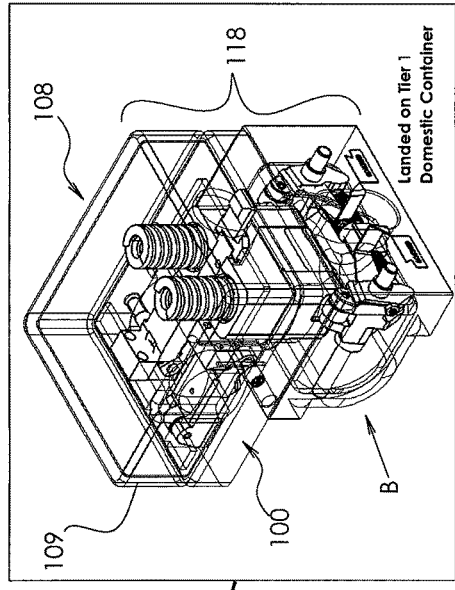
FIG. 7a is an enlarged detail taken from FIG. 7.
Figure 7:
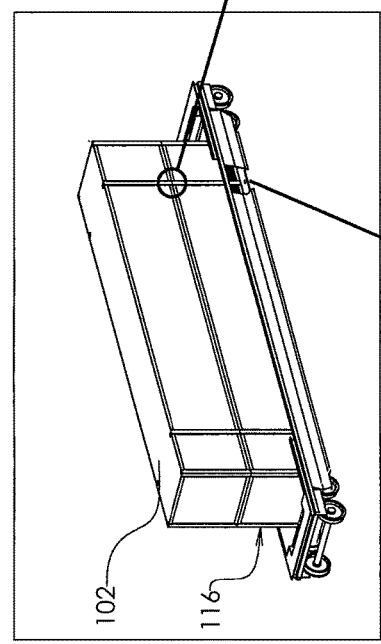
FIG. 7 is a perspective view of a typical well-car having two 53' domestic cargo containers stacked thereon, the domestic containers incorporating the secondary locking mechanisms of the present invention.

Secondary locking mechanism 100 is shown in FIGS. 6-8. More particularly, FIGS. 6-8 illustrate how locking mechanism 100 functions in the various stacking configurations. Turning first to FIGS. 6-6b, a domestic container 102 is shown stacked upon an ISO container 104. As mentioned above, locking mechanism 100 is installed within inboard opening 106 of bottom dual corner fitting 108 of domestic container 102. As shown, corner fitting 108 is typically formed with a substantially rectangular body 109 defining a lower mating edge 110. Lower mating edge 110 defines a plane P parallel with the bottom surface of corner fitting 108. When domestic container 102 is landed upon ISO container 104, the pin assembly 111 of the primary locking mechanism contacts a surface 112 of top single corner fitting 114, thereby causing pin assembly 111 to retract within corner fitting 108. As will be explained further hereinbelow, secondary locking mechanism 100 is designed and configured to engage corner fitting 114 in this type of stacking arrangement, thereby automatically locking domestic container 102 to ISO container 104—without the requirement for twistlocks.

Figure 7B:
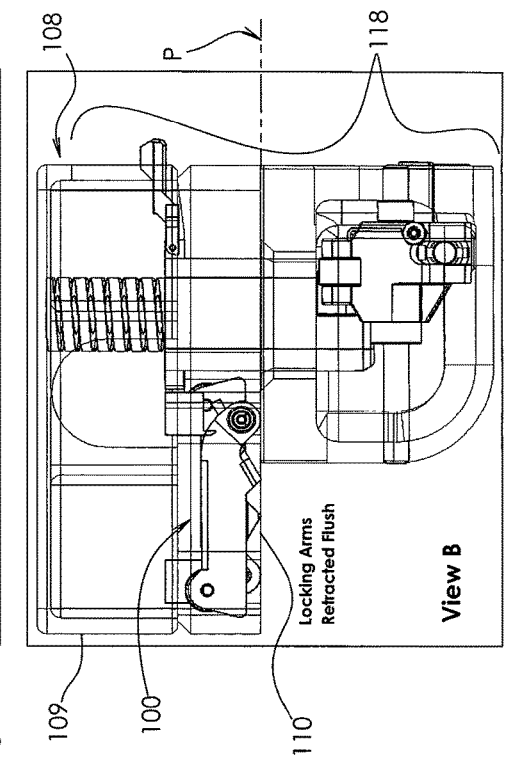
Figure 7C:
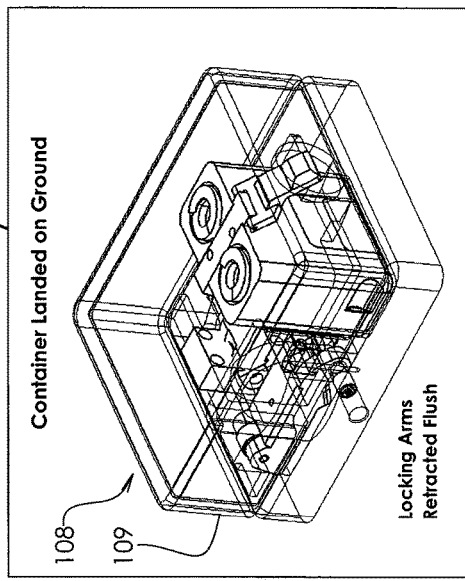
FIG. 7c is an enlarged detail of the corner fitting when the container is landed on the ground.

Turning next to FIGS. 7-7c, domestic container 102 is shown stacked upon another domestic container, i.e., container 116. In this stacking arrangement, primary locking mechanisms 118 secure domestic container 102 to domestic container 116. As best shown in FIG. 7b, secondary locking mechanism 100 is designed and configured to retract within the inboard opening of corner fitting 108 to a partially collapsed position wherein the locking arms are oriented substantially parallel to plane P. Likewise, secondary locking mechanism 100 will retract within corner fitting 108 to the partially collapsed position if the container is landed on the ground (see FIG. 7c).

Turning now to FIGS. 8-8b, secondary locking mechanism 100 is designed and configured to allow the domestic container to be landed on the floor of a well-car. As best shown in FIG. 8b, secondary locking mechanism 100 is designed and configured to retract within the inboard opening of corner fitting 108 to a fully collapsed position wherein the locking arms are oriented substantially perpendicular to plane P thereby allowing retainer 120 to penetrate and engage the inboard opening of corner fitting 108.

Figure 9:
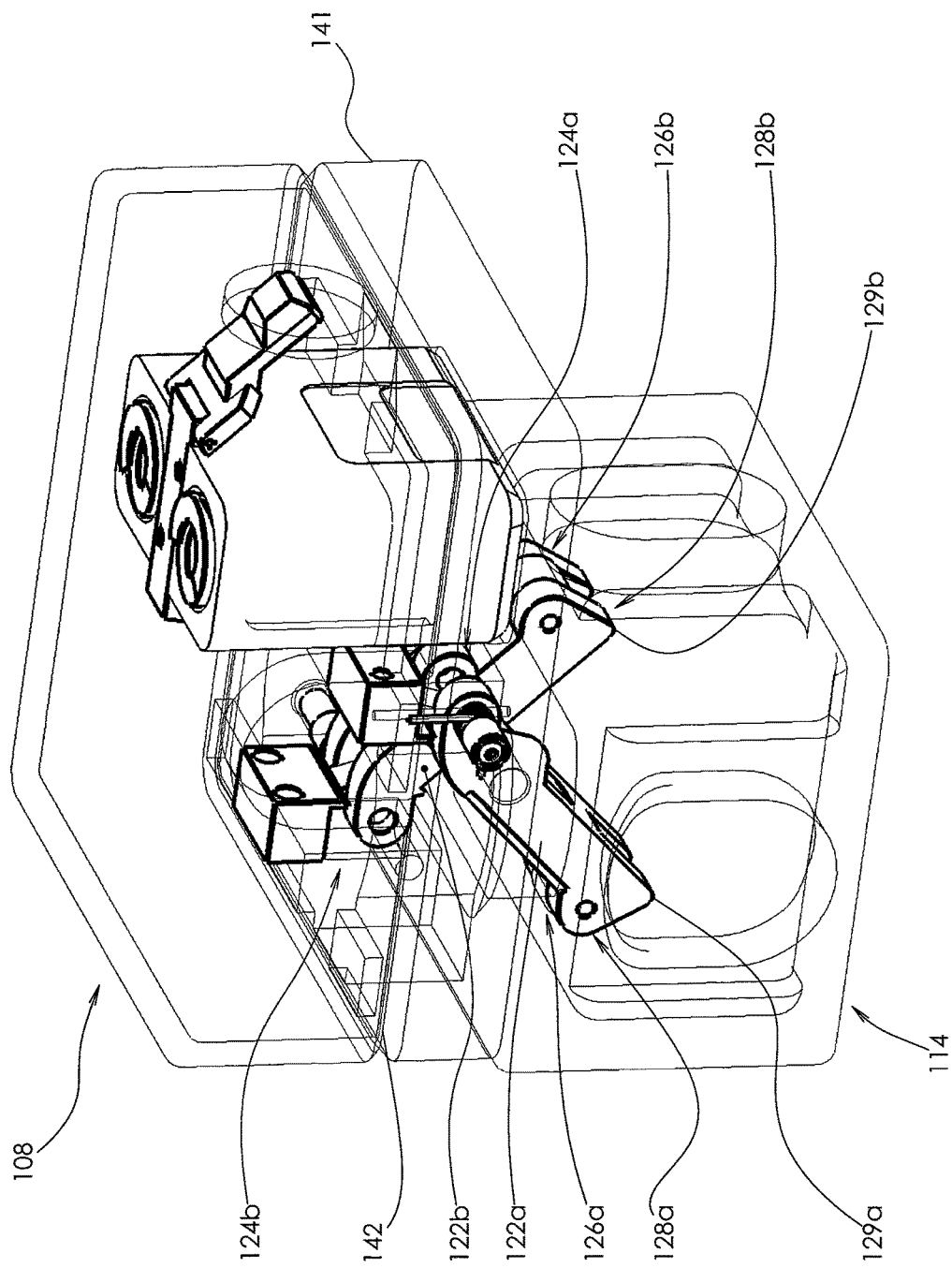
FIG. 9 is an enlarged perspective detail showing the engagement depicted in FIG. 6b.
Figure 9A:
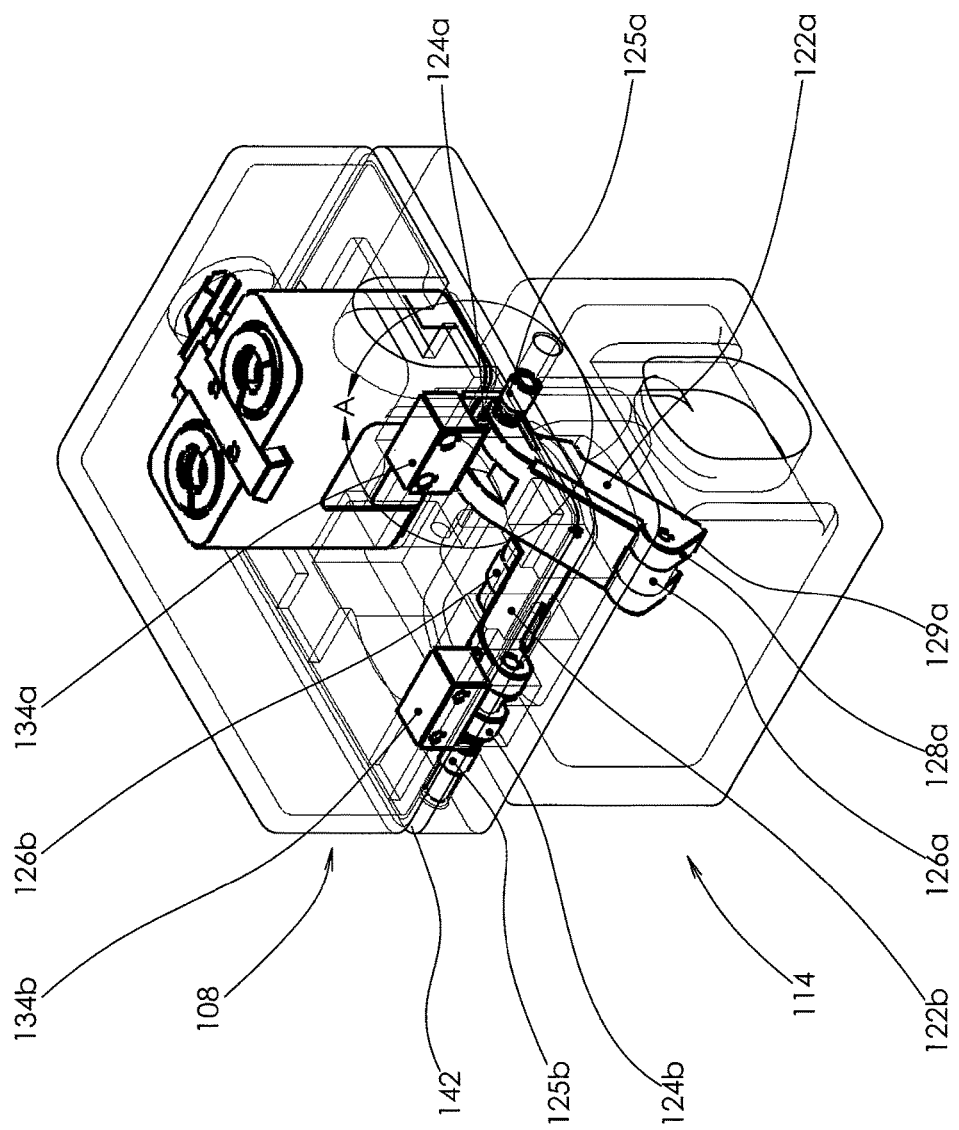
FIG. 9a is another enlarged perspective detail showing the engagement depicted in FIG. 6b.
Figure 9B:
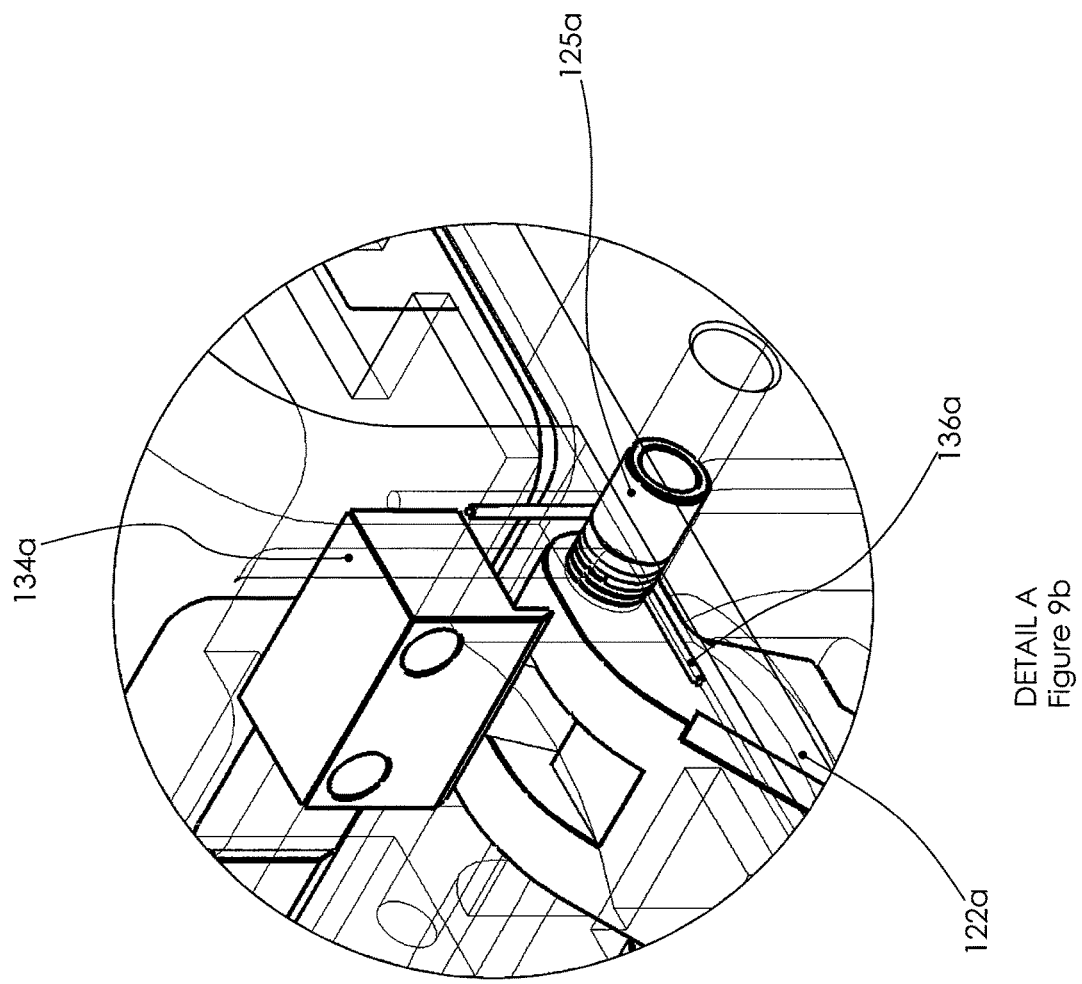

As best shown in FIGS. 9-9b, each of secondary locking mechanisms 100 includes a pair of locking arms 122a, 122b. Each of the locking arms is pivotably connected to corner fitting 108 at first ends 124a, 124b, respectively, via pins 125a, 125b, respectively. Rollers 126a, 126b are located at second ends 128a, 128b, respectively—and facilitate the engagement and release of locking mechanism 100 with the underlying corner fitting. In one preferred embodiment, each of seconds ends 128a, 128b is formed with a V-shaped configuration which define leading tips 129a, 129b. As described further hereinbelow, leading tips 129a, 129b facilitate engagement with the opening of an adjacent corner fitting.

Figure 11:
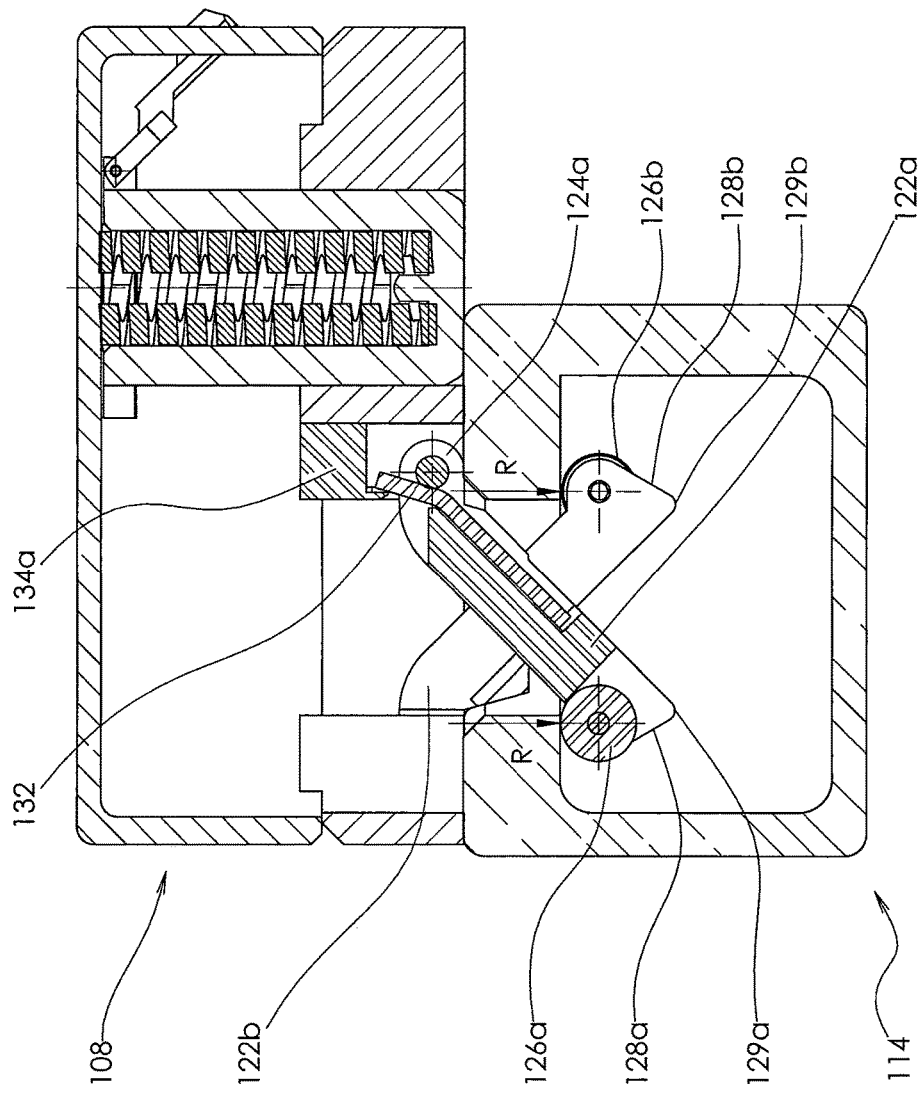
FIG. 11 is a sectional view showing the spring arrangement associated with one of the locking arms.

Referring now to FIG. 10, the locking arms 122a, 122b are preferably configured to extend downward from corner fitting 108 in a predetermined at-rest orientation when the domestic container is lifted and positioned for stacking. Preferably, the locking arms extend downward and through plane P in an X-shaped pattern when the first and second locking arms are located in the at-rest orientation such that the second ends of the locking arms are located to engage an adjacent corner fitting. In one preferred embodiment, the at-rest orientation of the locking arms is accomplished via the interaction of two cooperating springs. FIG. 11 schematically depicts the spring arrangement for one of the two locking arms (the other locking arm including a similar spring arrangement). As shown, the spring arrangement includes a leaf spring 132 coupled to locking arm 122a and having one end thereof positioned to contact a stationary block 134. To release locking arm 122a from the underlying corner fitting, it is necessary to rotate locking arm 122a counterclockwise. Inasmuch as leaf spring 132 is in contact with stationary block 134 in this orientation, any counter clockwise rotation of locking arm 122a has to overcome the spring force of leaf spring 132. Leaf spring 132 is accordingly sized to provide the desired level of locking force for the safe transportation of the containers. Each of the locking arms further includes a torque spring 136 (best seen in FIG. 9b). Torque spring 136 provides a counter clockwise biasing force to locking arm 122a, thereby holding arm 122a in the at-rest orientation shown in FIG. 10 prior to landing of the container. Torque spring 136 is selected to allow pivoting of the locking arms within the corner fitting during the situations depicted in FIGS. 7a-7c and FIGS. 8a-8b. The novel design of the spring arrangement allows the leaf spring to freely move together with the locking arm (without any application of spring force by the leaf spring) during pivoting of such locking arms into the corner fitting.

Figure 12:
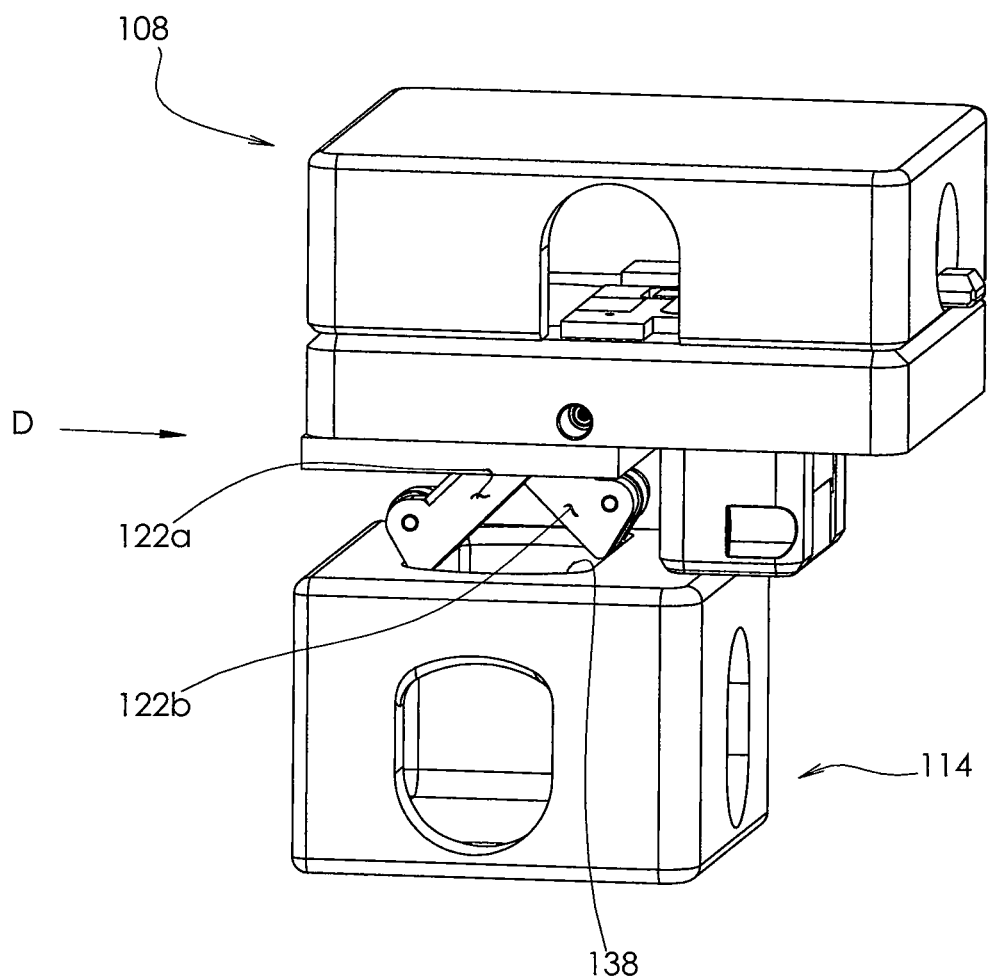
FIG. 12 is an enlarged detail showing the initial engagement of the locking arms with the opening in the underlying corner fitting.
Figure 13:
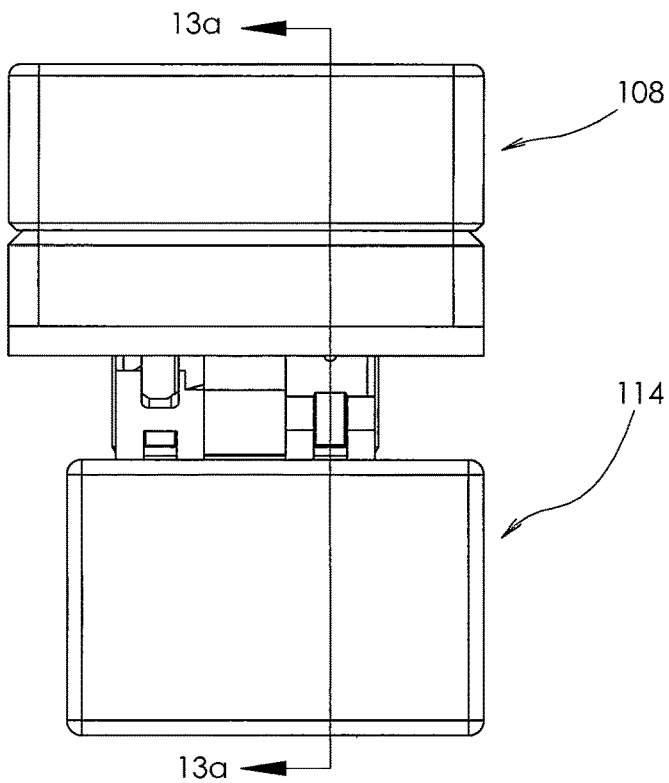
FIG. 13 is a view taken along Arrow D of FIG. 12.
Figure 13A:
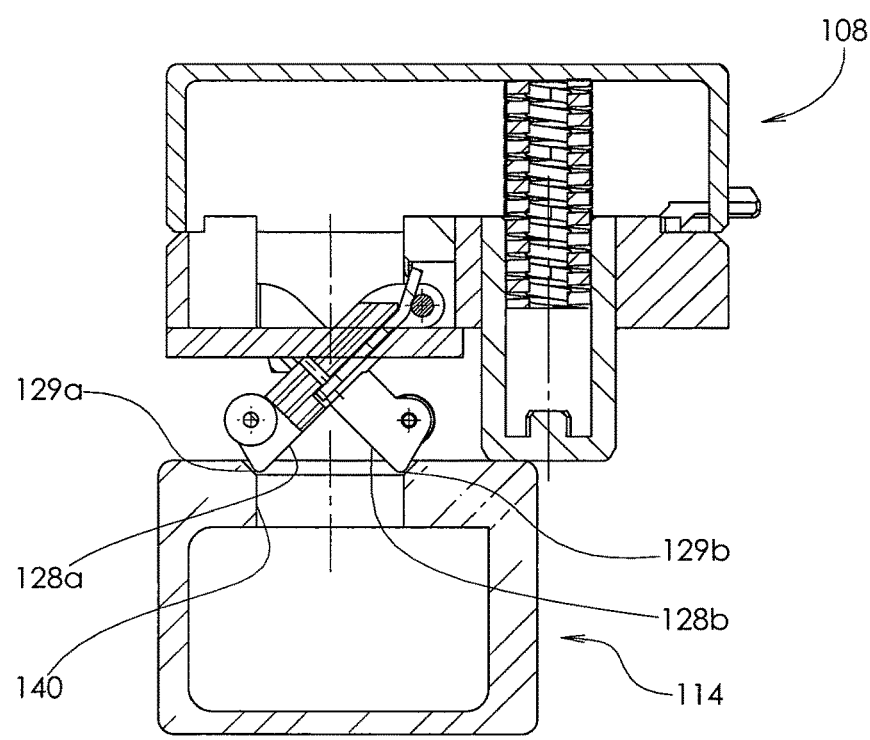
FIG. 13a is a sectional taken along lines 13a-13a of FIG. 13.
Figure 14:
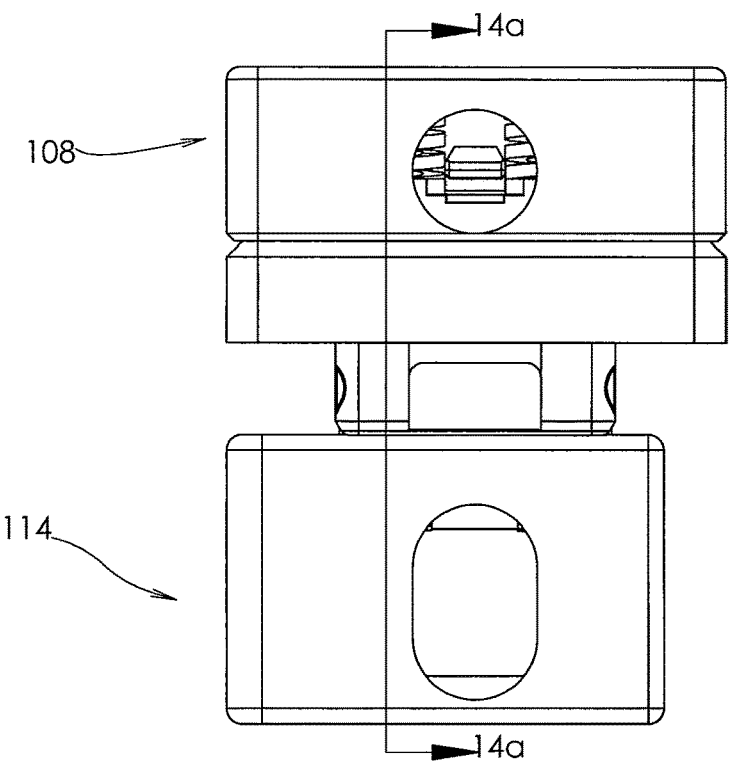
FIG. 14 is an elevational view of the corner fittings when the locking arm are partially engaged with the underlying corner fitting.
Figure 14A:
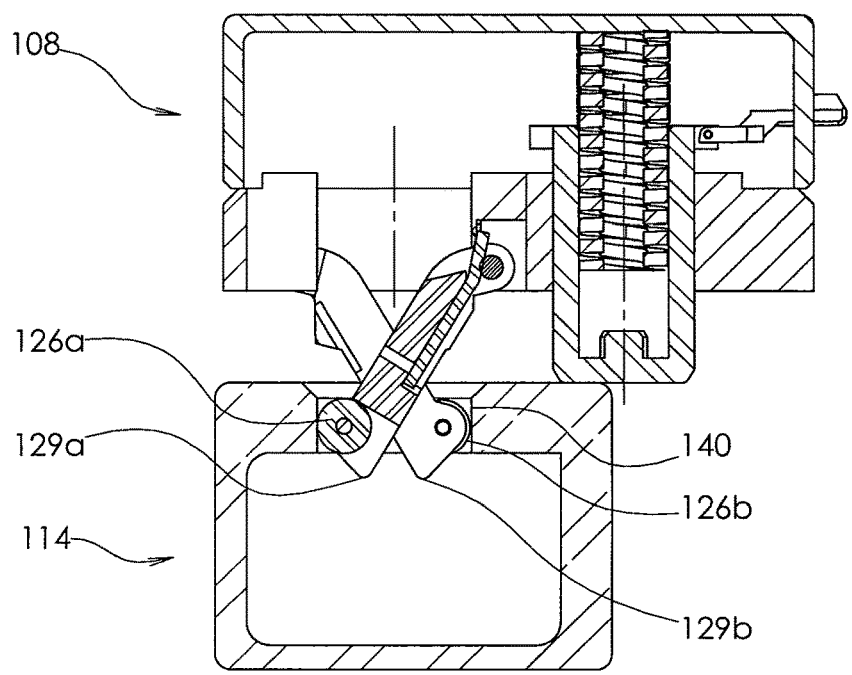
FIG. 14a is a sectional taken along lines 14a-14a of FIG. 14.
Figure 15:
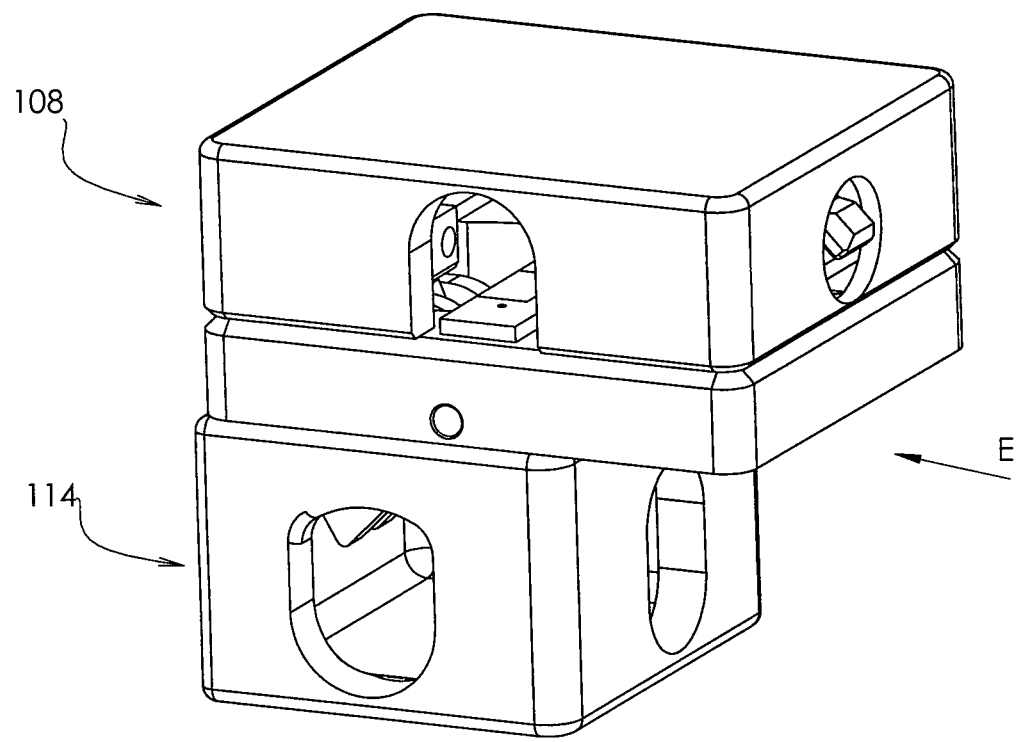
FIG. 15 is a view similar to FIG. 12 showing the arrangement of the corner fittings when the upper container is landed on the lower container.
Figure 16:
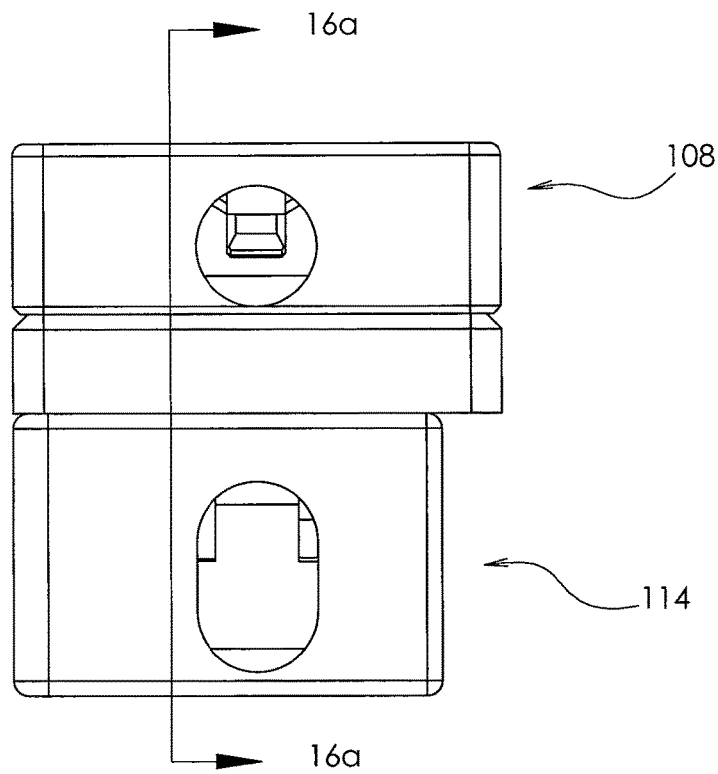
FIG. 16 is a view taken along Arrow E of FIG. 15.
Figure 16A:
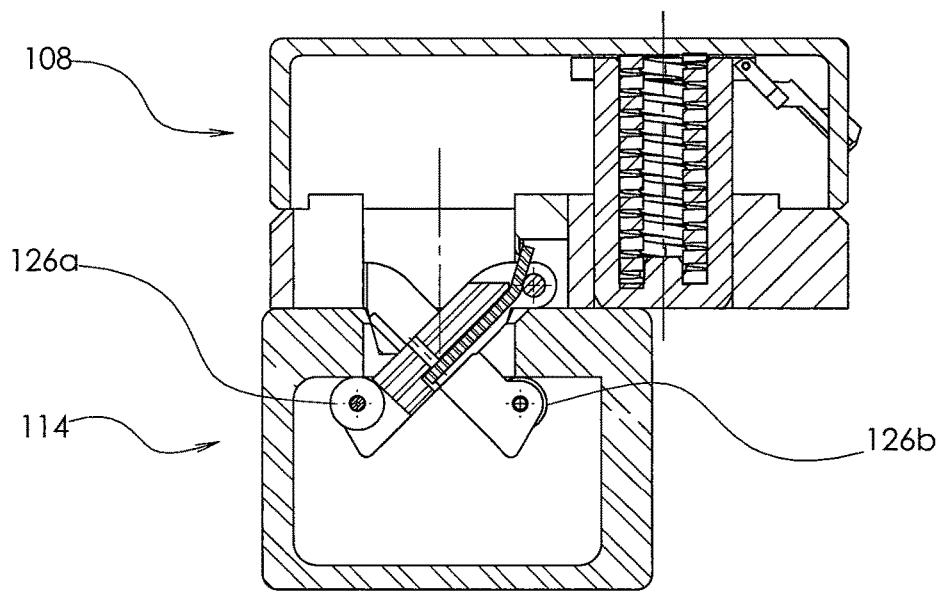
FIG. 16a is a sectional view taken along lines 16a-16a of FIG. 16.

FIGS. 12-16a depict the landing of a bottom corner fitting of a domestic container (not shown) on an upper corner fitting of an ISO container (not shown). As best seen in FIG. 12, locking arms 122a, 122b are positioned over opening 138 in corner fitting 114. As the domestic container is lowered (see FIGS. 13-13a), leading tips 129a, 129b of second ends 128a, 128b begin to engage opening 138. Leading tips 129a, 129b of second ends 128a, 128b are preferably configured with a chamfered geometry substantially similar to the chamfered lip of opening 138. As the domestic container is further lowered (see FIGS. 14-14a), rollers 126a, 126b engage inner walls 140 of corner fitting 114—thereby facilitating entry of the locking arms into corner fitting 114 and reducing wear/galling to the corner fitting. Once the domestic container is fully landed (see FIGS. 15-16a), the locking arms rotate outward—thereby allowing rollers 126a, 126b to engage the interior of corner fitting 114 whereby the upper domestic container is secured to the lower ISO container.

It is contemplated herein that the secondary locking mechanisms of the present invention can be incorporated into the inboard opening of the dual bottom corner fittings of a domestic container at the time of manufacture. It is also contemplated herein that the secondary locking mechanisms of the present invention can be retrofitted into existing domestic containers. In one such application, a lower portion of corner fitting 108 is removed. In one preferred embodiment, the lower ⅓ of the corner fitting is removed. Thereafter, a lock assembly including body portion 141 and the secondary locking mechanism is welded to the remaining portion of the bottom corner fitting. In one preferred embodiment, the lock assembly may include both the locking pin assembly and the secondary locking mechanism. Referring to FIG. 10, parting line 142 indicates the location where the existing corner fitting was cut, and defines an upper engagement edge of body portion 141.

In addition to the domestic containers described hereinabove, it is contemplated herein that the secondary automatic lock of the present invention may be utilized in other applications and to interconnect other containers used in the different forms of cargo transportation. For example, it is contemplated herein that locking mechanism 100 of the present invention may be installed in the bottom corner fittings of an ISO cargo container for automatic securement of two stacked ISO cargo containers.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A lock assembly for retrofitting a bottom corner fitting of a cargo container, said lock assembly comprising:
    a) a body portion, said body portion defining a substantially rectangular upper engagement edge sized for mating with and securement to said bottom corner fitting, said body portion further defining a substantially rectangular lower mating edge, said lower mating edge defining a plane P, and wherein said body portion defines a first opening extending from said upper engagement edge to said lower mating edge, said first opening defining opposing first and second sidewalls;
    b) an automatic locking mechanism positioned within said first opening of said body portion, said automatic locking mechanism including:
        i) first and second locking arms having first and second ends respectively, said first end of said first locking arm being pivotally attached to said first sidewall of said first opening and said first end of said second locking arm being pivotally attached to said second sidewall of said first opening;
        ii) first and second rollers, said first roller being positioned at said second end of said first locking arm and said second roller being positioned at said second end of said second locking arm;
        iii) first and second operating springs, said first operating spring cooperating with said first end of said first locking arm to resist counterclockwise rotation of said first locking arm about said first end thereof, said second operating spring cooperating with said first end of said second locking arm to resist clockwise rotation of said second locking arm about said first end thereof; and
        iv) first and second locating springs, said first locating spring cooperating with said first end of said first locking arm to bias said first locking arm to a first at-rest orientation, said second locating spring cooperating with said first end of said second locking arm to bias said second locking arm to a second at-rest orientation;

and wherein said locking arms extend downward from said body portion and through said plane P in an X-shaped pattern when said first and second locking arms are located in said at-rest orientations such that said second ends of said locking arms are located to engage an adjacent corner fitting.

2. The lock assembly according to claim 1, wherein said body portion defines a first inboard opening and a second outboard opening, and wherein said automatic locking mechanism is located in said inboard opening.

3. The lock assembly according to claim 1, wherein each of said operating springs is a leaf spring, each of said leaf springs being sized to provide a torsional locking force to said respective locking arm sufficient to ensure each of said locking arms remains engaged with an adjacent corner fitting during transportation.

4. The lock assembly according to claim 1, wherein each of said locating springs is a torque spring, each of said torque springs being sized and positioned to rotate said respective locking arm to said at-rest orientations.

5. The lock assembly according to claim 1, wherein each of said first ends of said locking arms has a forked configuration, and further comprising:
    a first pin for pivotably attaching said first locking arm to said first sidewall; and
    a second pin for pivotably attaching said second locking arm to said second sidewall.

6. The lock assembly according to claim 1, wherein said first locking arm is rotatable in a clockwise direction from said first at-rest orientation to a partially collapsed position, and wherein said second locking arm is rotatable in a counterclockwise direction from said second at-rest orientation to a partially collapsed position, and wherein each of said locking arms is located within said first opening and orientated substantially parallel to said plane P when said locking arms are in said partially collapsed positions.

7. The lock assembly according to claim 6, wherein said first locking arm is rotatable in a clockwise direction from said first at-rest orientation to a fully collapsed position, and wherein said second locking arm is rotatable in a counterclockwise direction from said second at-rest orientation to a fully collapsed position, and wherein each of said locking arms is located within said first opening and orientated substantially perpendicular to said plane P when said locking arms are in said fully collapsed positions.

8. The lock assembly according to claim 1, wherein each of said second ends of said locking arms has a V-shaped configuration defining a leading tip, said leading tips of said locking arms being located to initiate contact with opposing sides of an adjacent corner fitting when said locking arms are positioned in said at-rest orientation.

9. The lock assembly according to claim 8, wherein each of said rollers are located to make secondary contact with said adjacent corner fitting as said locking arms penetrate therein, said rollers sized and located to contact interior surfaces of said adjacent corner fitting upon penetration of said locking arms within said adjacent corner fitting, and wherein said leaf springs bias said rollers of said locking arms into contact with said interior surfaces of said adjacent corner fitting.

10. The lock assembly according to claim 1, wherein at least a portion of said leaf spring is secured to and pivots with the respective locking arm.

11. A cargo container, comprising:
    a closable vessel for stowing cargo during transportation;

a plurality of upper corner fittings secured to an upper surface of said vessel for allowing stacking of a second cargo container thereon;

a plurality of bottom corner fittings secured to a lower surface of said vessel, each of said bottom corner fittings including:
  a) a substantially rectangular body defining a lower mating edge, said lower mating edge defining a plane P, and wherein said body defines a first opening extending through said lower mating edge, said first opening defining opposing first and second sidewalls;
  b) an automatic locking mechanism positioned within said first opening of said body, said automatic locking mechanism including:
    i) first and second locking arms having first and second ends respectively, said first end of said first locking arm being pivotally attached to said first sidewall of said first opening and said first end of said second locking arm being pivotally attached to said second sidewall of said first opening;
    ii) first and second rollers, said first roller being positioned at said second end of said first locking arm and said second roller being positioned at said second end of said second locking arm;
    iii) first and second operating springs, said first operating spring cooperating with said first end of said first locking arm to resist counterclockwise rotation of said first locking arm about said first end thereof, said second operating spring cooperating with said first end of said second locking arm to resist clockwise rotation of said second locking arm about said first end thereof; and
    iv) first and second locating springs, said first locating spring cooperating with said first end of said first locking arm to bias said first locking arm to a first at-rest orientation, said second locating spring cooperating with said first end of said second locking arm to bias said second locking arm to a second at-rest orientation;

and wherein said locking arms extend downward from said body portion and through said plane P in an X-shaped pattern when said first and second locking arms are located in said at-rest orientations such that said second ends of said locking arms are located to engage an adjacent corner fitting.

12. The container according to claim 11, wherein said body portion defines a first inboard opening and a second outboard opening, and wherein said automatic locking mechanism is located in said inboard opening.

13. The container according to claim 11, wherein each of said operating springs is a leaf spring, each of said leaf springs being sized to provide a torsional locking force to said respective locking arm sufficient to ensure each of said locking arms remains engaged with an adjacent corner fitting during transportation.

14. The container according to claim 11, wherein each of said locating springs is a torque spring, each of said torque springs being sized and positioned to rotate said respective locking arm to said at-rest orientations.

15. The container according to claim 11, wherein each of said first ends of said locking arms has a forked configuration, and further comprising:

a first pin for pivotably attaching said first locking arm to said first sidewall; and a second pin for pivotably attaching said second locking arm to said second sidewall.

16. The container according to claim 11, wherein said first locking arm is rotatable in a clockwise direction from said first at-rest orientation to a partially collapsed position, and wherein said second locking arm is rotatable in a counterclockwise direction from said second at-rest orientation to a partially collapsed position, and wherein each of said locking arms is located within said first opening and orientated substantially parallel to said plane P when said locking arms are in said partially collapsed positions.

17. The container according to claim 16, wherein said first locking arm is rotatable in a clockwise direction from said first at-rest orientation to a fully collapsed position, and wherein said second locking arm is rotatable in a counterclockwise direction from said second at-rest orientation to a fully collapsed position, and wherein each of said locking arms is located within said first opening and orientated substantially perpendicular to said plane P when said locking arms are in said fully collapsed positions.

18. The container according to claim 11, wherein each of said second ends of said locking arms has a V-shaped configuration defining a leading tip, said leading tips of said locking arms being located to initiate contact with opposing sides of an adjacent corner fitting when said locking arms are positioned in said at-rest orientation.

19. The container according to claim 18, wherein each of said rollers are located to make secondary contact with said adjacent corner fitting as said locking arms penetrate therein, said rollers sized and located to contact interior surfaces of said adjacent corner fitting upon penetration of said locking arms within said adjacent corner fitting, and wherein said leaf springs bias said rollers of said locking arms into contact with said interior surfaces of said adjacent corner fitting.

20. The container according to claim 11, wherein at least a portion of said leaf spring is secured to and pivots with the respective locking arm.

\* \* \* \* \*